United States Patent
Kim et al.

(10) Patent No.: US 9,819,909 B2
(45) Date of Patent: Nov. 14, 2017

(54) VIDEO RECORDER AND SURVEILLANCE SYSTEM INCLUDING THE SAME

(71) Applicant: Hanwha Techwin Co., Ltd., Changwon-si (KR)

(72) Inventors: Dooman Kim, Changwon-si (KR); Sungbong Cho, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 288 days.

(21) Appl. No.: 14/806,139

(22) Filed: Jul. 22, 2015

(65) Prior Publication Data

US 2016/0065905 A1 Mar. 3, 2016

(30) Foreign Application Priority Data

Sep. 1, 2014 (KR) ........................ 10-2014-0115693

(51) Int. Cl.
*H04N 7/18* (2006.01)
(52) U.S. Cl.
CPC ................................... *H04N 7/181* (2013.01)
(58) Field of Classification Search
CPC ......... H04N 7/181; H04N 5/232; H04N 5/222
See application file for complete search history.

(56) References Cited

U.S. PATENT DOCUMENTS

| 5,615,017 | A | * | 3/1997 | Choi | ........................ | G06T 9/00 |
| | | | | | | 348/159 |
| 2006/0171669 | A1 | * | 8/2006 | Kaminosono | ........ | G11B 27/034 |
| | | | | | | 386/265 |
| 2011/0149080 | A1 | | 6/2011 | Jain et al. | | |
| 2015/0125124 | A1 | * | 5/2015 | Dozier | ................... | H04N 5/772 |
| | | | | | | 386/223 |

FOREIGN PATENT DOCUMENTS

| KR | 1020060020393 A | 3/2006 |
| KR | 1020140019664 A | 2/2014 |

* cited by examiner

*Primary Examiner* — Huy T Nguyen
(74) *Attorney, Agent, or Firm* — Sughrue Mion, PLLC

(57) ABSTRACT

In a surveillance system, a plurality of video recorders and a plurality of cameras are connected to a communication network. The video recorders communicate with one another and share camera registration information with one another. If one of the video recorders has an error during operation, at least one of the other video recorders performs a proxy recording operation in place of the video recorder having the error.

20 Claims, 14 Drawing Sheets

VIDEO RECORDER AND SURVEILLANCE SYSTEM INCLUDING THE SAME

CROSS-REFERENCE TO RELATED APPLICATION

This application claims priority from Korean Patent Application No. 10-2014-0115693, filed on Sep. 1, 2014, in the Korean Intellectual Property Office, the disclosure of which is incorporated herein in its entirety by reference.

BACKGROUND

1. Field

Apparatuses and methods consistent with exemplary embodiments relate to a surveillance system, and more particularly, to a surveillance system including a plurality of video recorders and a plurality of cameras connected to a communication network.

2. Description of the Related Art

In a surveillance system, a plurality of cameras and a single video recorder may be connected to one another through a communication network. Here, the video recorder may manage 64 channels, that is, 64 cameras.

However, a plurality of video recorders may be used according to conditions such as the size of a surveillance system, the number of cameras, or user requirements. That is, a plurality of video recorders and a plurality of cameras may be connected to a communication network. In this case, the plurality of cameras may be allocated to the plurality of video recorders.

SUMMARY

Exemplary embodiments of the inventive concept provide a surveillance system including a plurality of video recorders and a plurality of cameras connected to a communication network. At least one or each of the video recorders may automatically register the cameras so as to prevent a surveillance vacuum, in which a certain monitoring area may not be monitored, caused by errors in the video recorders.

Various aspects will be set forth in part in the description which follows and, in part, will be apparent from the description, or may be learned by practice of the presented embodiments.

According to one or more exemplary embodiments, there is provided a surveillance system which may include a plurality of video recorders and a plurality of cameras are connected to a communication network. The video recorders may communicate with each other and share camera registration information with one another. Here, the camera registration information may include information about at least one camera, among the plurality of cameras, which is connected to and registered at a corresponding video recorder among the plurality of video recorders. If it is determined that one of the video recorders has an error, at least one proxy video recorder among the other video recorders which does not have the error, in place of the video recorder having the error, may perform proxy recording of data captured by at least one camera registered at the video recorder having the error.

The video recorder having the error may provide camera information for the proxy recording of the data to the at least one proxy video recorder according to a preset proxy recording guideline. Here, the camera information for the proxy recording may include information about the at least one camera registered at the video recorder having the error.

The video recorder having the error may select the at least one proxy video recorder, among the plurality of other video recorders, and the at least one camera based on at least one of recording loads of the other video recorders and an order of priority of the plurality of cameras, and provide information about the at least one camera to the at least one proxy video recorder.

At least one of the plurality of video recorders may transmit a request for state information to the other video recorders and perform proxy recording of data captured by a camera registered at a video recorder not responding to the request in place of the video recorder not responding to the request.

If the at least one of the plurality of video recorders receives the state information from the non-responding video recorder, the at least one video recorder may transmit information about the camera subjected to the proxy recording and recording time information to the non-responding video recorder.

At least one of the plurality of video recorders may search the communication network to detect the other video recorders and acquire camera registration information from at least one of the detected video recorders.

At least one video recorder among the plurality of video recorders may register at least one camera among the plurality of cameras which is not registered at the other video recorders, and record data captured by the camera registered at the video recorder. If error occurrence at the video recorder is detected, the video recorder may transmit a proxy recording request for recording the data captured by the camera registered at the video recorder to at least one of the other video recorders, and if the error occurrence at another video recorder among the other video recorders is detected, the video recorder may perform proxy recording of data captured by a camera registered at the other video recorder having the error In order to register the camera not registered in the other video recorders, the video recorder may search the communication network to detect another video recorder among the plurality of video recorders and acquire address information of the detected video recorder.

The video recorder may transmit a request for camera registration information to the detected video recorder and receive the camera registration information from the detected video recorder.

The request for camera registration information may include authentication key information used to authenticate the video recorder transmitting the request for camera registration information.

In order to register the camera not registered in the other video recorders, the video recorder may transmit a request for camera registration state information at the other video recorders to the other video recorders and receive the camera registration state information from the other video recorders.

If the error occurrence at the video recorder is detected, the video recorder may request the at least one of the other video recorders or a user to send, to the video recorder, information about a proxy video recorder which is controlled to record the data, captured by the camera registered at the video recorder, in place of the video recorder, and receive the information about the proxy video recorder, and may send, to the proxy recorder, information about a proxy camera which is registered at the video recorder and controlled to transmit data captured by the proxy camera to the proxy video recorder.

The video recorder may request the at least one of the other video recorders to set a proxy video recorder, among the plurality of video recorders, which is to record data captured by at least one camera registered at the at least one of the other video recorders instead of the at least one of the other video recorders, and receive a result of the proxy video recorder setting from the at least one of the other video recorders.

The video recorder may further request the at least one of the other video recorders to set a proxy camera which is registered at another video recorder among the plurality of video recorders and is to transmit data captured by the proxy camera to the at least one of the other video recorders instead of the other video recorder, and receive a result of the proxy camera setting from the at least one of the other video recorders.

According to one or more exemplary embodiments, there is provided a video recorder which may include: a search module configured to search a communication network for a plurality of cameras and a plurality of other video recorders connected to the communication network; a camera registration module configured to acquire camera registration information from the other video recorders and register at least one of the cameras which is not registered in the other video recorders; and a proxy setting module configured to request at least one of the other video recorders to record data captured by a camera registered at the video recorder instead of recording by the video recorder if error occurrence at the video recorder is detected, and control recording of data, captured by a camera registered at another video recorder among the other video recorders, at the video recorder instead of recording at the other video recorder if the error occurrence at the other video recorder is detected.

If the error occurrence at the video recorder is detected, the proxy setting module may provide camera information about the camera registered at the video recorder to a proxy video recorder among the other video recorder which is controlled to record the data, captured by the camera registered at the video recorder, instead of the video recorder. The proxy recorder may be set according to a preset proxy recording guideline.

If the error occurrence at the video recorder is detected, the proxy setting module may select at least one proxy video recorder and at least one camera which is controlled to transmit data captured by the at least one camera to the at least one proxy video recorder for recording thereat instead of recording at the video recorder based on at least one of recording loads of the other video recorders and an order of priority of the plurality of cameras, and provide information about the at least one camera to the at least one proxy video recorder.

The proxy setting module may transmit a request for state information about the other video recorders to the other video recorders and control recording of data, captured by a camera which is registered at a video recorder not responding to the request, at the video recorder instead of recording at the non-responding video recorder.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION OF THE EXEMPLARY EMBODIMENTS

Figure 1:
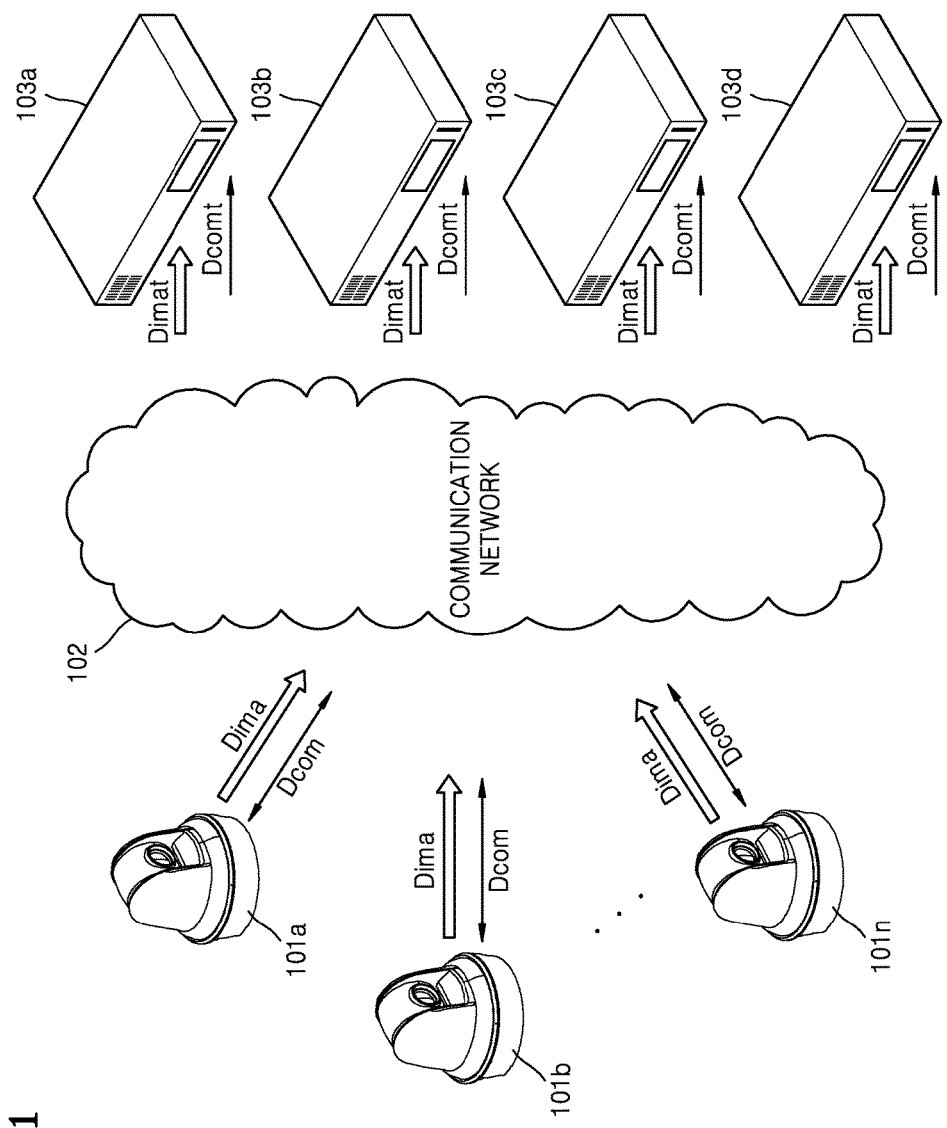
FIG. 1 is a view illustrating a surveillance system, according to an exemplary embodiment.

Reference will now be made in detail to exemplary embodiments, examples of which are illustrated in the accompanying drawings. In this regard, the exemplary embodiments may have different forms and should not be construed as being limited to the descriptions set forth herein. Accordingly, the exemplary embodiments are merely described below, by referring to the drawings, to explain various aspects of the inventive concept. As used herein, the term "and/or" includes any and all combinations of one or more of the associated listed items. Expressions such as "at least one of," when preceding a list of elements, modify the entire list of elements and do not modify the individual elements of the list. Moreover, detailed descriptions related to well-known functions or configurations will be ruled out in order not to unnecessarily obscure subject matters of the exemplary embodiments.

It will be understood that although the terms "first" and "second" are used herein to describe various elements, these elements should not be limited by these terms. Terms are only used to distinguish one element from other elements.

In the following descriptions of the exemplary embodiments, the technical terms are used only for explaining a specific exemplary embodiment while not limiting the inventive concept. The meaning of 'include' or 'comprise' specifies a property, a fixed number, a step, a process, an element, a component, and a combination thereof but does not exclude other properties, fixed numbers, steps, processes, elements, components, and combinations thereof.

The exemplary embodiments may be embodied as functional blocks and various processing operations as illustrated in the drawings. The functional blocks may be implemented with various hardware and/or software configurations executing specific functions. For example, at least one of the functional blocks may employ integrated circuit configurations such as a memory, processing, logic, a look-up table and the like capable of executing various functions upon control of microprocessors or other control devices. In a similar manner to that in which the elements of the exemplary embodiments can be executed with software programming or software elements, the exemplary embodiments may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, the exemplary embodiments may employ conversional arts to establish an electronic environment, process signals and/or process data. Terms such as "mechanism," "element," "means," and "configuration" may be widely used and are not limited to mechanical and physical configurations. Such terms may have the meaning of a series of routines of software in association with a processor or the like.

FIG. 1 is a view illustrating a surveillance system, according to an exemplary embodiment.

Referring to FIG. 1, in the surveillance system of the exemplary embodiment, a plurality of video recorders 103a to 103d and a plurality of cameras 101a to 101n are connected to a communication network 102. In the surveillance system illustrated in FIG. 1, user terminals are not shown for conciseness and clarity of description.

The video recorders 103a to 103d may be digital video recorders (DVRs), network video recorders (NVRs), or network video storages (NVSs).

In FIG. 1, Dima refers to video and audio data input from each of the cameras 101a to 101n to the communication network 102 such as the Internet.

Dcom refers to communication signals between the communication network 102 and the cameras 101a to 101n.

Dimat refers to video and audio data input from the communication network 102 to each of the video recorders 103a to 103d.

Dcomt refers to communication signals between the communication network 102 and the video recorders 103a to 103d.

Referring to FIG. 1, the video recorders 103a to 103d are configured to share camera registration information with one another via mutual communication.

Therefore, the cameras 101a to 101n may be automatically registered in each of the video recorders 103a to 103d.

When allocating a plurality of cameras to a plurality of video recorders and registering the cameras in the video recorders, first, it is inconvenient because users have to manually register cameras by repeatedly inputting information, and second it is tiresome because users have to check camera registration information of a video recorder or video recorders that have been already registered so as to register cameras in another video recorder.

In addition, when a plurality of video recorders operate, if an error occurs in one of the video recorders, a large surveillance vacuum may be created.

In the exemplary embodiment, however, the video recorders 103a to 103d share camera registration information with one another. Therefore, users do not need to manually register the cameras 101a to 101n by repeatedly inputting information and check camera registration information of a video recorder or video recorders that have been already registered so as to register the video recorders 103a to 103d in another video recorder.

In addition, when the video recorders 103a to 103d operate, even if an error has occurred in one of the video recorders 103a to 103d, one or more of the other video recorders may take over the recording operation of the video recorder having errors. Therefore, a surveillance vacuum may not be caused by errors in the video recorders 103a to 103d (errors in one of the video recorders 103a to 103d).

The surveillance of FIG. 1 will now be described in more detail.

Figure 2:
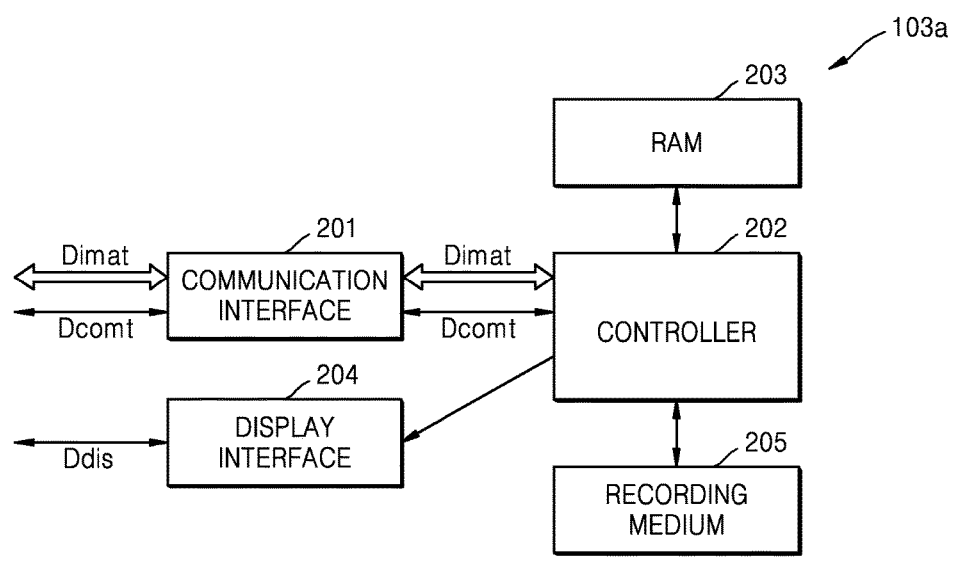
FIGS. 2 and 3 illustrate an exemplary structure of a video recorder depicted in FIG. 1, according to an exemplary embodiment.
Figure 3:
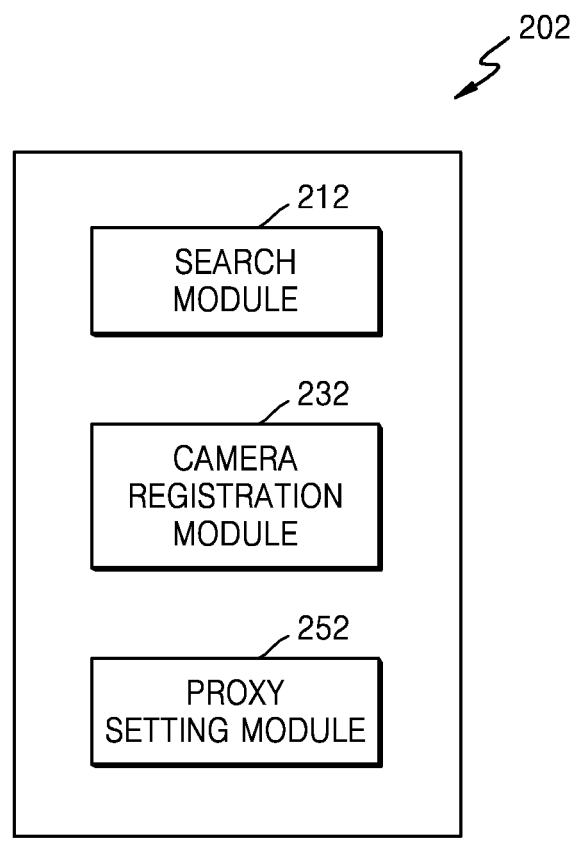

FIGS. 2 and 3 illustrate a configuration of the video recorder 103a according to an exemplary embodiment.

Referring to FIG. 2, the video recorder 103a includes a communication interface 201, a controller 202, a random access memory (RAM) 203 which is a volatile memory, a recording medium 205, and a display interface 204. The communication interface 201 functions as a network interface card (NIC).

The configuration and operation of one of the video recorders 103a to 103d (the video recorder 103a) will now be described in detail with reference to FIGS. 1 to 3.

Packets of video and audio data Dimat input through the communication network 102 from registered cameras (some of the cameras 101a to 101n) are input to the controller 202 through the communication interface 201.

In a data receiving mode, the controller 202 processes data packets and loads the data packets on the RAM 203.

In a data transmitting mode, the controller 202 generates data packets and outputs the data packets. That is, the controller 202 transmits video and audio data, which is loaded on the RAM 203 according to channels, to user terminals through the communication interface 201. Thus, unlike in FIG. 1, video and audio data Dimat is indicated by two-way arrows in FIG. 2.

The above-described data transmitting and receiving operations of the video recorder 103a may be performed by transmission control protocol/internet protocol (TCP/IP) layers, but not being limited thereto.

In addition, based on user settings, the controller 202 outputs video and audio data loaded on the RAM 203 according to channels (cameras) to the display interface 204. Therefore, if a display is connected to the display interface 204, the video and audio data (denoted by Ddis) may be input to the display through the display interface 204 and may be displayed on the display.

In addition, the controller 202 stores video and audio data, which is loaded on the RAM 203 according to channels, in the recording medium 205.

Referring to FIG. 3, the controller 202 may include a search module 212, a camera registration module 232, and a proxy setting module 252.

The search module 212 may search for the cameras 101a to 101n and other video recorders connected to the communication network 102. To this end, a general-purpose protocol such as WS-Discovery used in the Open Network Video Interface Forum (ONVIF) may be used, but not being limited thereto.

The camera registration module 232 may acquire camera registration information from the video recorders which have been detected by the search module 212, and may register at least one camera among the cameras which have been detected and are not registered in the other video recorders. The camera registration module 232 may compare the whole list of the detected cameras with the camera registration information of the other video recorders and may automatically extract a list of non-registered cameras. If camera registration information of the camera registration module 232 changes, the camera registration module 232 transmits the changed camera registration information to the other video recorders connected to the communication network 102 so that the other video recorders may consider the changed camera registration information when they register cameras.

If an error occurs in the video recorder 103a, the proxy setting module 252 may set at least one of the other video recorders as a proxy video recorder and may request the proxy video recorder to record data in place of the video recorder 103a. If one of the other video recorders has an error, at least one of the cameras registered in the video recorder having the error may be additionally registered in the camera registration module 232, and data of the additionally registered camera may be recorded by proxy under the control of the proxy setting module 252.

When the proxy setting module 252 requests the proxy video recorder to perform a proxy recording operation for a certain camera, the proxy setting module 252 may provide information about the certain camera according to preset proxy recording guidelines. Alternatively, when the proxy setting module 252 requests the proxy video recorder to perform a proxy recording operation, the proxy setting module 252 may select at least one proxy video recorder and at least one camera of which data will be recorded by the at least one proxy video recorder based on recording loads on the other video recorders and the order of priority of cameras registered in the camera registration module 232, and then may provide information about the at least one camera to the at least one proxy video recorder.

The proxy setting module 252 may periodically request state information from the other video recorders and may determine a video recorder that does not respond to the request as a video recorder having an error. Then, proxy recording may be performed for the video recorder having an error under the control of the proxy setting module 252. In this case, the proxy setting module 252 may additionally register at least one of the cameras registered in the video recorder having an error, and proxy recording of data of the additionally registered camera may be performed under the control of the proxy setting module 252.

Hereinafter, operations of the video recorders 103*a* to 103*d* will be described in more detail with reference to FIGS. 4 to 14 according to exemplary embodiments.

Figure 4:
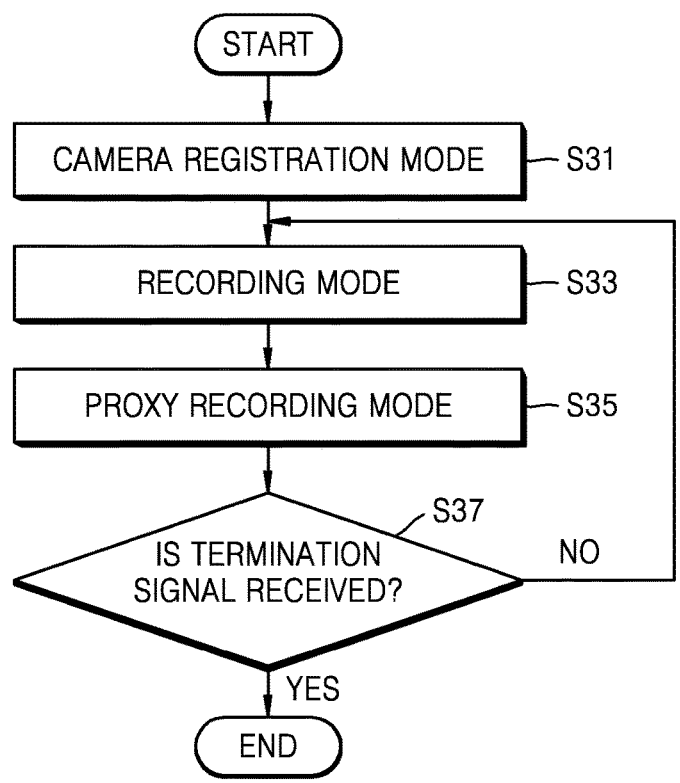
FIG. 4 is a flowchart illustrating main operations of a controller depicted in FIG. 2, according to an exemplary embodiment.

FIG. 4 illustrates main operations of the controller 202 depicted in FIG. 2.

The controllers 202 of each of the video recorders 103*a* to 103*d* has a camera registration mode (operation S31), a recording mode (operation S33), and a proxy recording mode (operation S35).

In the camera registration mode (operation S31), the controller 202 registers cameras that are not registered in the other video recorders. At this time, the controller 202 communicates with the controllers 202 of the other video recorders and shares camera registration information with the other video recorders.

In this manner, the cameras 101*a* to 101*n* may be automatically registered in at least one or each of the video recorders 103*a* to 103*d*. Detailed operations in the camera registration mode (operation S31) will be described later with reference to FIG. 5.

In the recording mode (operation S33), the controller 202 records video and audio data Dimat received from the registered cameras among the cameras 101*a* to 101*n*.

In the proxy recording mode (operation S35), if an error occurs or error occurrence is detected, the controller 202 may send a proxy recording request to at least one of the other video recorders. Furthermore, in the proxy recording mode (operation S35), the controller 202 may receive a proxy recording request from a video recorder having an error, and a proxy recording operation may be performed for the video recorder having an error under the control of the controller 202. Furthermore, in the proxy recording mode (operation S35), if the controller 202 detects a video recorder having an error among the other video recorders, even if a proxy recording request is not received from the video recorder having an error, a proxy recording operation may be performed for the video recorder having an error under the control of the controller 202.

Therefore, a surveillance vacuum may be prevented even though some of the video recorders 103*a* to 103*d* have errors or malfunction. The proxy recording mode (operation S35) will be described later in more detail with reference to FIGS. 6 to 14.

The recording mode (operation S33) and the proxy recording mode (operation S35) are repeatedly performed until a termination signal is received (operation S37). The order of the recording mode (operation S33) and the proxy recording mode (operation S35) is not limited to the order shown in FIG. 4. For example, the recording mode (operation S33) and the proxy recording mode (operation S35) may be performed at the same time. In another example, the recording mode (operation S33) may be performed, and then the proxy recording mode (operation S35) may be performed. In another example, the proxy recording mode (operation S35) may be performed, and then the recording mode (operation S33) may be performed. In another example, only the recording mode (operation S33) may be performed, or only the proxy recording mode (operation S35) may be performed.

Figure 5:
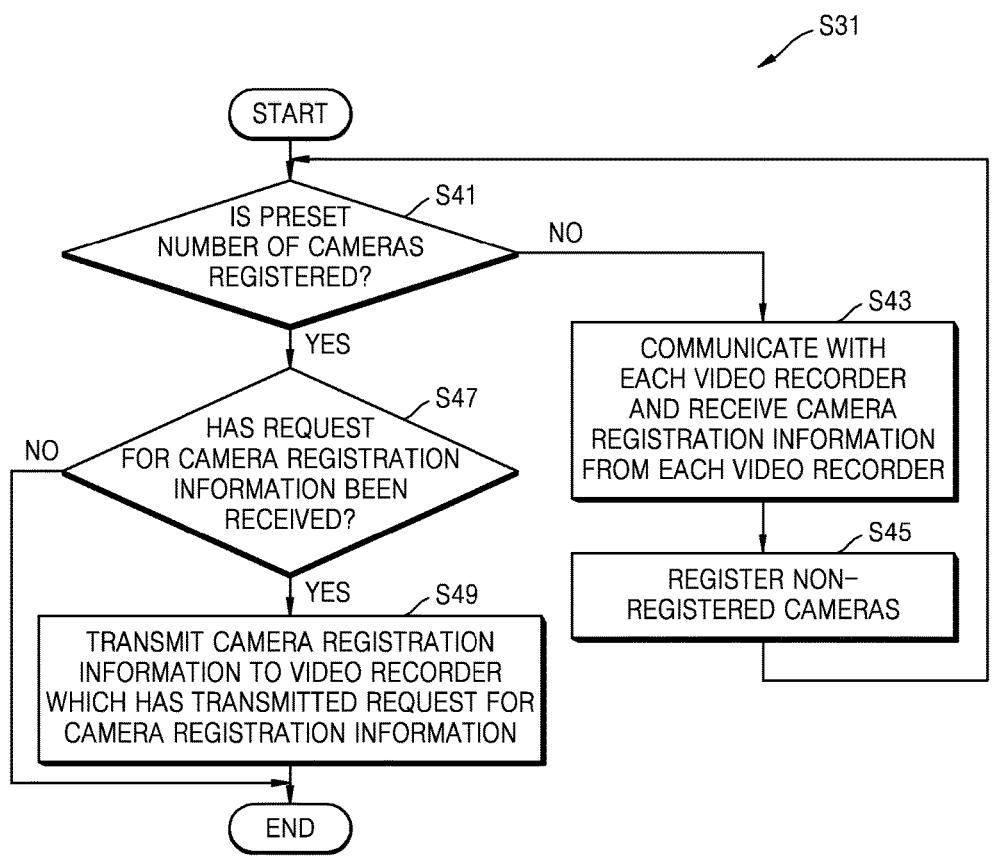
FIG. 5 is a flowchart illustrating detailed operations in a camera registration mode depicted in FIG. 4, according to an exemplary embodiment.

FIG. 5 illustrates detailed operations in the camera registration mode (operation S31).

First, the controller 202 determines whether a preset number of cameras have been registered (operation S41). The preset number of cameras refers to the number of cameras to be registered according to user settings. If the preset number of cameras is not set by a user, the maximum number of manageable channels may be used as the preset number of cameras. Alternatively, the controller 202 may acquire information about the number of cameras registered in each of the other video recorders and may determine the preset number of cameras to be equal to the number of cameras. When the controller 202 is first connected to the communication network 102, the controller 202 may be operated in the camera registration mode. Different preset numbers of cameras may be set for the video recorders 103*a* to 103*d* by taking into consideration the capacities of the video recorders 103*a* to 103*d*, recording times, and properties of data to be recorded.

If it is determined that as many cameras as the preset number have not yet been registered, the controller 202 communicates with each of the other video recorders to receive camera registration information of the other video recorders (operation S43). The camera registration information may include the number, IP addresses, ports, login information, and profile information of cameras.

The operation S43 will now be described in more detail through examples.

First, the controller 202 searches the communication network 102 to detect other video recorders while transmitting a search message by a multicast or broadcast method. In this case, a general-purpose protocol such as WS-Discovery used in the ONVIF, not being limited thereto, may be used. The controller 202 may use "NetworkVideoStorage" as a search type. Information about a detected video recorder may include an address of the detected video recorder for network access (for example, IP address), an authentication key of the detected video recorder for network access, and a time period for the authentication key to be valid.

Next, the controller 202 performs authentication procedures using the addresses for network access. The authentication procedures may be performed using information about user tokens or information obtained by encoding the user tokens using authentication key information. The controller 202 sends an authentication password and a request for camera registration information to each of the detected video recorders by a unicast method. Then, each of the other video recorders may send camera registration information to authenticated video recorders and authentication failure information to non-authenticated video recorders.

The controller 202 may send a camera registration state checking request to each of the other video recorders which have authenticated the controller 202 and may receive information about camera registration states (such as not started, started, and done states). For example, if a first video recorder (one of the video recorders 103a to 103d) requests a second video recorder (another of the video recorders 103a to 103d) to send information about registered cameras when the second video recorder is registering cameras, the controller 202 of the second video recorder may inform the first video recorder that cameras are being registered in the second video recorder.

The controller 202 may send a request for camera registration information to video recorders that have completed camera registration and may receive camera registration information from the video recorders. If the controller 202 of the first video recorder receives a registration completion message from the second video recorder when the controller 202 of the first video recorder is registering cameras, the controller 202 of the first video recorder may know a network access address of the second video recorder. In this case, the controller 202 of the first video recorder may send a request for camera registration information to the second video recorder by a unicast method.

The controller 202 registers non-registered cameras (some of the cameras 101a to 101n) based on received camera registration information (operation S45). For this, the controller 202 searches for non-registered cameras (some of the cameras 101a to 101n) while transmitting a search message by a multicast or broadcast method. In this case, a general-purpose protocol such as WS-Discovery used in the ONVIF, not being limited thereto, may be used.

The operations S43 and S45 are repeated until as many cameras as the preset number have been registered. If as many cameras as the preset number have been registered, the controller 202 transmits a registration completion message to the other video recorders by a multicast or broadcast method. When the controller 202 transmits the registration completion message to the other video recorders, the controller 202 does not transmit camera registration information because of security.

After the controller 202 completes registration of cameras, the controller 202 determines whether the controller 202 has received a request for camera registration information from another video recorder (operation S47). If it is determined that the controller 202 has received a request for camera registration information from another video recorder, the controller 202 transmits camera registration information to the other video recorder (operation S49).

Figure 6:
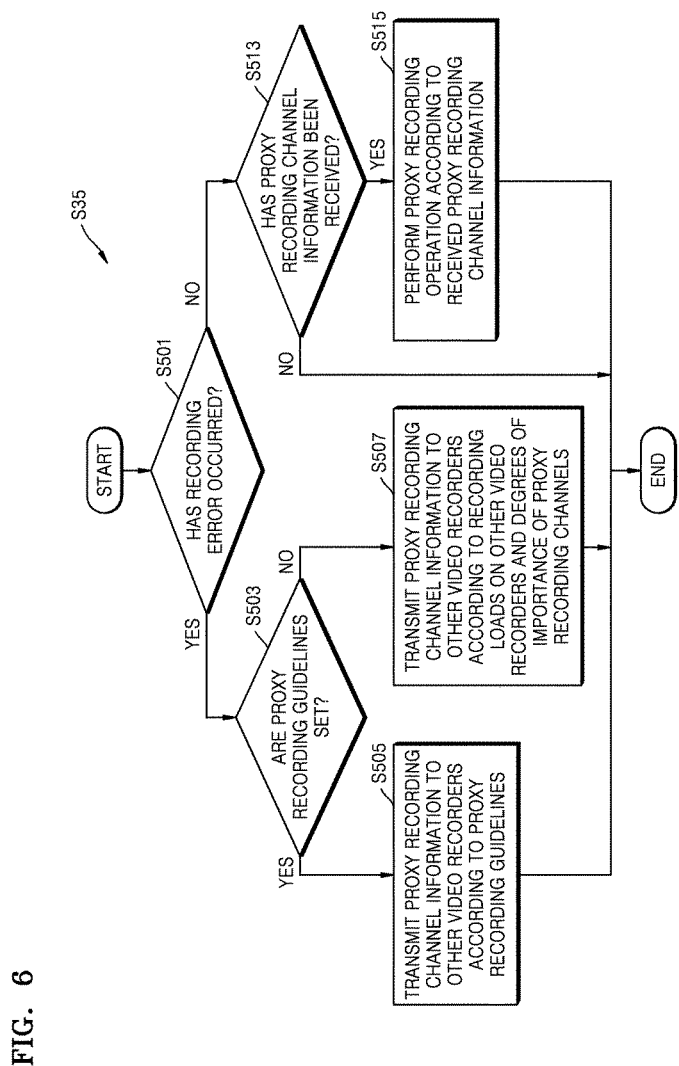
FIGS. 6 and 7 are flowcharts illustrating detailed operations in a proxy recording mode depicted in FIG. 4, according to exemplary embodiments.
Figure 7:
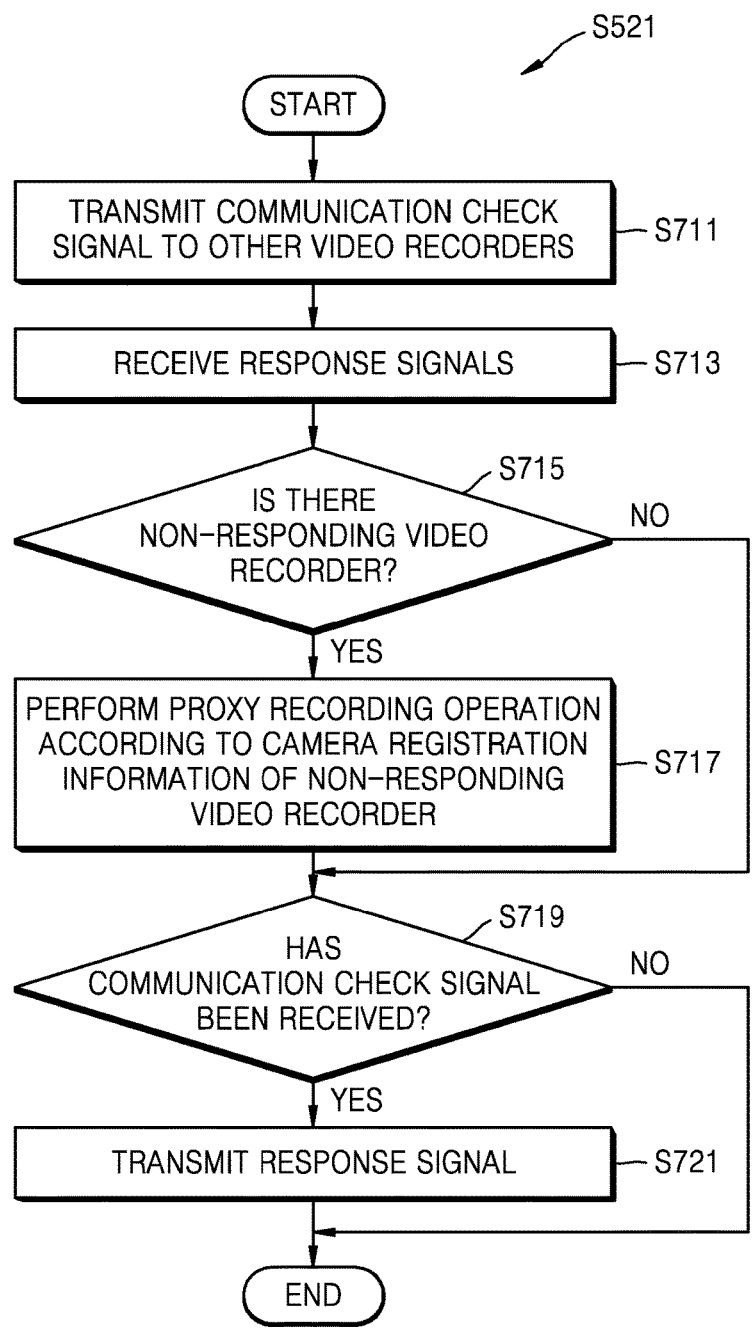

FIGS. 6 and 7 illustrate a proxy recording mode (operation S35), according to an exemplary embodiment.

Referring to FIG. 1, each of the video recorders 103a to 103d may determine whether an error has occurred in the recording mode (operation S33 shown in FIG. 4), and if it is determined that the error has occurred in the recording mode, each of the video recorders 103a to 103d may request a proxy video recorder to perform a proxy recording operation.

In this case, the error may include a recording error or a network error. The recording error refers to an error related to the recording medium 205 such as a sector error or an incomplete storing error. The incomplete storing error relates to the case in which only key frames of data are stored instead of storing all frames of data because of an excessively large amount of data to be stored. In case of a network error, transmission and reception of information may be impossible unlike the case of recording error. Therefore, each of the video recorders 103a to 103d may periodically check the states of the other video recorders.

FIG. 6 is a flowchart illustrating detailed operations in the proxy recording mode (operation S35) when a recording error has occurred.

In the recording mode (operation S33 in FIG. 4), first, the controller 202 determines whether a recording error has occurred (operation S501).

If it is determined that a recording error has occurred, the controller 202 determines whether a proxy recording guideline is set (operation S503). The proxy recording guideline contains information about at least one proxy video recorder that will record data by proxy, and channels (or cameras) of which data the proxy video recorder will record. The proxy recording guideline may be preset by a user or a master.

If it is determined that the proxy recording guideline is set, the controller 202 transmits proxy recording channel information (camera information) to other video recorders according to the proxy recording guideline (operation S505). The channel information (or camera information) may include IP addresses, ports, login information, and profile information of cameras. The profile information may include resolutions, codec information, frames per second (FPS), bitrates, etc.

If it is determined that the proxy recording guideline is not set, the controller 202 selects one of the other video recorders having a relatively low recording load as a proxy video recorder by taking into consideration recording loads of the other video recorders and the degrees of importance of proxy recording channels. Then, the controller 202 informs the proxy video recorder of channel information (or camera information) of proxy recording channels determined according to the order of priority of channels (operation S507). The number of proxy recording channels is determined according to the remaining capacity of the proxy video recorder. The case in which the proxy recording guideline is not set by a user may mean that a proxy video recorder is not set.

The order of priority of channels may be set according to the degrees of importance of channels, that is, cameras. The degrees of importance of cameras (or channels) may be determined according to environments in which cameras are installed or the purposes of cameras, and the order of priority of cameras may be determined according to the degrees of importance of the cameras. For example, in surveillance for controlling entrance and exit, data of an entrance camera installed to monitor an entrance is more important than data of the other cameras, and thus it may be set that the entrance camera has the highest priority.

The recording load of a video recorder may be determined based on one or more of a communication load and the remaining capacity of the recording medium 205 of the video recorder (the ratio of registered channels to manageable channels). For example, it is assumed that each of the video recorders 103a, 103b, and 103c (hereinafter referred to as first to third video recorders 103a, 103b, and 103c) can manage a maximum of sixteen channels and the first video recorder 103a has a recording error. In addition, it is assumed that the second video recorder 103b has ten registered channels, and the third video recorder 103c has five registered channels. In this case, the controller 202 of the first video recorder 103a may transmit information about eight channels having relatively high priorities to the third video recorder 103c and may transmit information about six channels having relatively low priorities to the second video recorder 103b.

Meanwhile, in the recording mode, if it is determined that no recording error has occurred (operation S501), and a proxy recording request and proxy recording channel information have been received (operation S513), the controller 202 performs a proxy recording operation according to the proxy recording channel information (operation S515). The controller 202 registers cameras corresponding to proxy recording channels and transmits results of camera registration to a video recorder which has requested the proxy recording operation. Then, the video recorder which has requested the proxy recording operation may send information about channels that are not included in the proxy recording operation by the controller 202 to another video recorder.

FIG. 7 is a flowchart illustrating detailed operations in the proxy recording mode (operation S35) when a network error has occurred, according to an exemplary embodiment.

The controller 202 transmits a communication check signal to the other video recorders (operation S711).

Next, the controller 202 receives response signals from the other video recorders (operation S713).

The controller 202 may determine whether there is a video recorder not sending a response signal (operation S715). If there is a video recorder not sending a response signal within a set time period, the controller 202 may determine that there is a network error.

Based on camera registration information of a video recorder determined as having a network error, the controller 202 may additionally register cameras of which data will be recorded by proxy (operation S717). First, the controller 202 may check its current state to determine whether it is possible to additionally register cameras and the number of cameras that can be additionally registered therein. Based on the order of priority of channels, the controller 202 may additionally register at least one of the cameras registered in the video recorder determined as having a network error. After additionally registering cameras, the controller 202 may transmit a camera registration completion message to the other video recorders by a multicast or broadcast method. The controller 202 or a user may send a proxy recording request to the other video recorders for cameras that are registered in the video recorder determined as having a network error but are not selected as proxy recording cameras.

For example, when the first, second, and third video recorders 103a, 103b, and 103c are connected to the communication network 102, the first video recorder 103a may not receive a response to a communication check signal transmitted to the third video recorder 103c. In this case, the first video recorder 103a may determine that the third video recorder 103c has a network error and may register six cameras having relatively high priorities of cameras registered in the third video recorder 103c within the available capacity of the first video recorder 103a (for example, six channels). In addition, the first video recorder 103a may send a proxy recording request to the second video recorder 103b for next-priority cameras registered in the third video recorder 103c.

If the controller 202 has received a communication check signal from a video recorder recovered from the network error (operation S719), the controller 202 may sent a response signal containing information about channels subjected to proxy recording and proxy recording times (operation S721). Therefore, a user may search and replay video and audio data recorded in the third video recorder 103c, and video and audio data proxy-recorded in the first video recorder 103a during the period of network errors.

Figure 8:
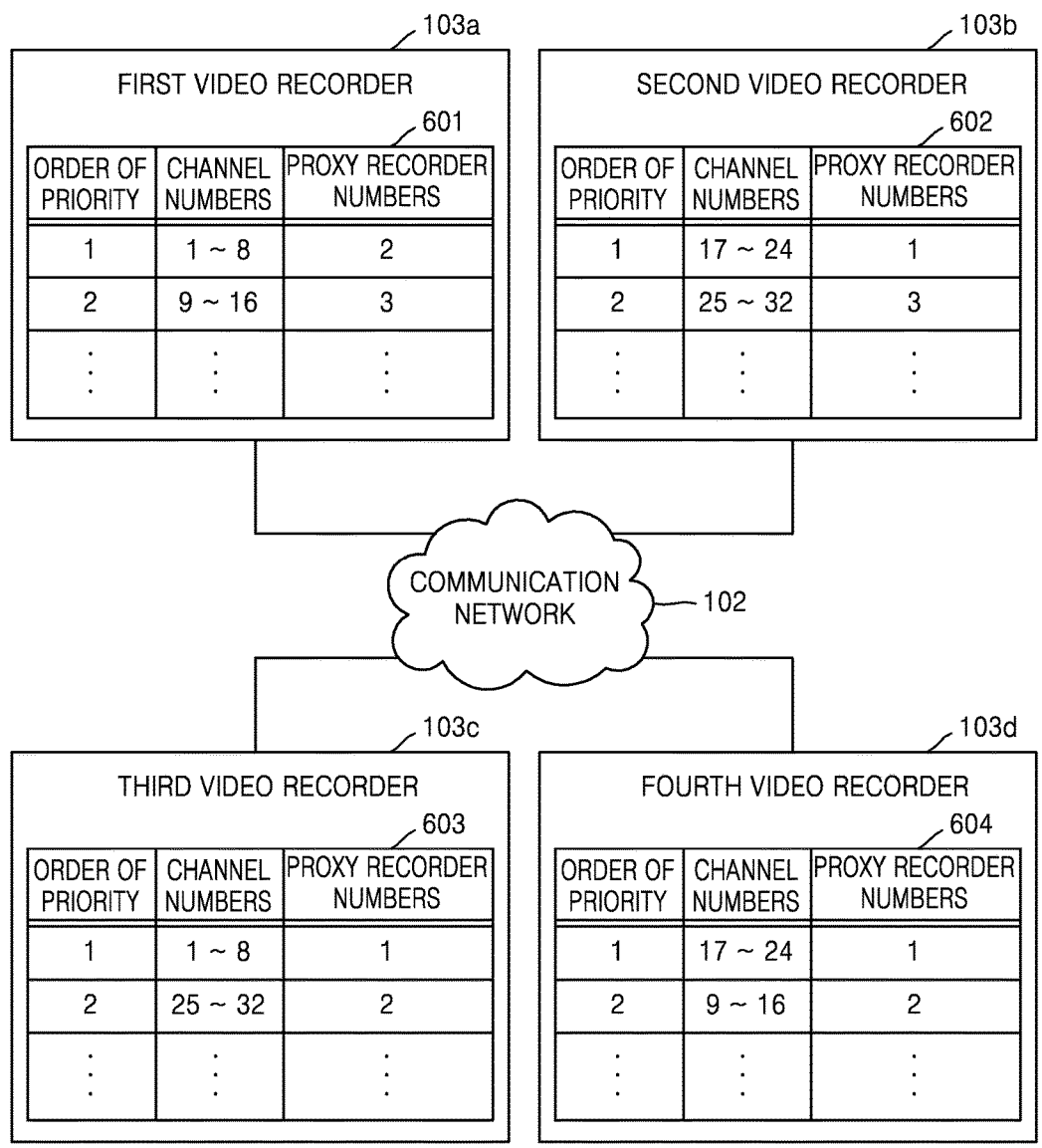
FIG. 8 is a view illustrating exemplary proxy recording guidelines respectively set for video recorders, according to an exemplary embodiment.

FIG. 8 illustrates exemplary proxy recording guidelines 601 to 604 respectively set for the first to fourth video recorders 103a to 103d. The proxy recording guidelines 601 to 604 may be set by a user or a master. The proxy recording guidelines 601 to 604 each contain information about proxy video recorders that will function as proxy video recorders to record video and audio data Dimat of cameras registered in a malfunctioning video recorder (i.e. a video recorder having an error).

In FIG. 8, proxy recorder NOs. 1, 2, and 3 refer to the first video recorder 103a, the second video recorder 103b, and the third the video recorder 103c, respectively.

For example, if the first video recorder 103a has an error, the controller 202 of the first video recorder 103a requests the second video recorder 103b to record data of first to eighth channels by proxy. In addition, the controller 202 of the first video recorder 103a requests the third video recorder 103c to record data of ninth to sixteenth channels by proxy.

For example, if the second video recorder 103b has an error, the controller 202 of the second video recorder 103b requests the first video recorder 103a to record data of seventeenth to twenty fourth channels by proxy. In addition, the controller 202 of the second video recorder 103b requests the third video recorder 103c to record data of twenty fifth to thirty second channels by proxy.

For example, if the third video recorder 103c has an error, the controller 202 of the third video recorder 103c requests the first video recorder 103a to record data of first to eighth channels by proxy. In addition, the controller 202 of the third video recorder 103c requests the second video recorder 103b to record data of twenty fifth to thirty second channels by proxy.

For example, if the fourth video recorder 103d has an error, the controller 202 of the fourth video recorder 103d requests the first video recorder 103a to record data of seventeenth to twenty fourth channels by proxy. In addition, the controller 202 of the fourth video recorder 103d requests the second video recorder 103b to record data of ninth to sixteenth channels by proxy.

In the exemplary embodiment, as shown in FIG. 8, proxy recording guidelines may be preset for video recorders, and proxy video recorders may be newly selected according to network conditions.

FIGS. 9 to 14 illustrate exemplary messages that may be used in the surveillance system of the exemplary embodiment.

Such messages may be transmitted between video recorders or between a user and video recorders. In FIGS. 9 to 14, each of sending and receiving ends may be a video recorder or a user terminal (such as an operator terminal). In addition, video recorders may have a master-slave relationship.

Figure 9:
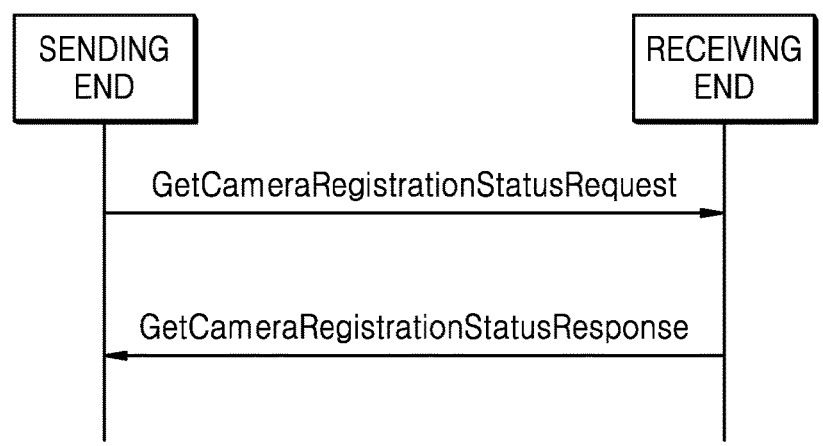
FIGS. 9 to 14 illustrate exemplary messages that may be used in the surveillance system of the exemplary embodiment.

FIG. 9 and Table 1 illustrate exemplary messages that may be sent or received for checking a camera registration state of a video recorder connected to a network. A sending end may transmit a GetCameraRegistrationStatusRequest message to request information about a camera registration state, and a receiving end may transmit a GetCameraRegistrationStatusResponse message to report the camera registration state of the receiving end. The camera registration state may be one of a Not Started state indicating that camera registration has not been started, a Started state indicating that camera registration has been started but has not yet been completed, and a Done state indicating that camera registration has been completed. Here, each of the sending end and the receiving end may be one of a plurality of video recorders.

TABLE 1

| Message Name | Description |
| --- | --- |
| GetCameraRegistrationStatusRequest | A request for camera registration state information |
| GetCameraRegistrationStatusResponse | A response to a camera registration state information request<br>Not Started: camera registration has not been started<br>Started: camera registration has been started but has not yet been completed<br>Done: camera registration has been completed |

Figure 10:
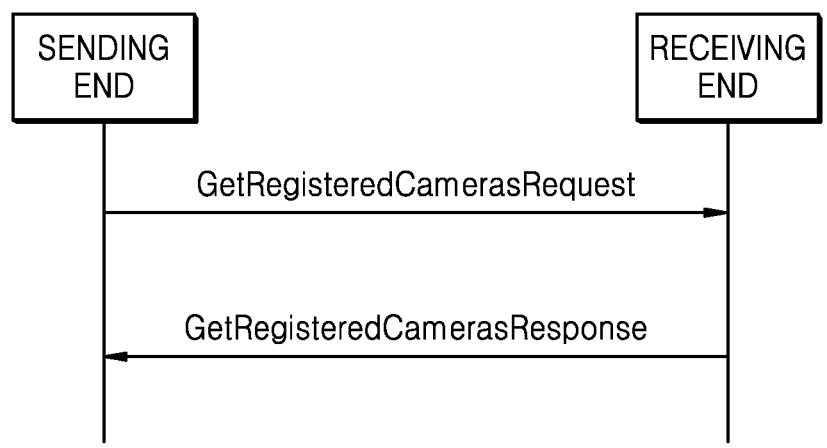

FIG. 10 and Table 2 illustrate exemplary messages that may be sent or received for checking information about cameras of a video recorder connected to a network. A sending end may transmit a GetRegisteredCamerasRequest message to request information about registered cameras, and a receiving end may transmit a GetRegisteredCamerasResponse message to report information about registered cameras. Here, each of the sending end and the receiving end may be one of a plurality of video recorders.

TABLE 2

| Message Name | Description |
| --- | --- |
| GetRegisteredCamerasRequest | A request for information about registered cameras |
| GetRegisteredCamerasResponse | A response to a request for information about cameras<br>: IP addresses, ports and login information, and profile information |

Figure 11:
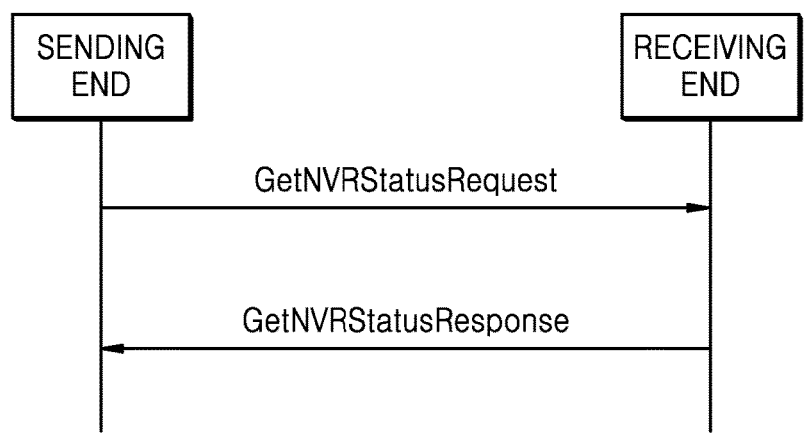

FIG. 11 and Table 3 illustrate exemplary messages that may be sent or received for checking the states of video recorders connected to a network. A sending end may transmit a GetNVRStatusRequest message to request state information of video recorders connected to a network. The state information may include hard disk drive (HDD), central processing module (CPU), and network information, camera recording state information, performance states, and response timeouts. A receiving end received the GetNVRStatusRequest message may send a GetNVRStatusResponse message including HDD, CPU, and network information, camera recording state information, and performance states. If the receiving end does not response within a timeout period, the sending end may determine that the receiving end has a network error. Here, each of the sending end and the receiving end may be one of a plurality of video recorders.

TABLE 3

| Message Name | Description |
| --- | --- |
| GetNVRStatusRequest | A request for information about NVR (NVS) states<br>: HDD, CPU, network, camera recording state information, performance states, response timeouts |

TABLE 3-continued

| Message Name | Description |
| --- | --- |
| GetNVRStatusResponse | A response to a request for information about NVR (NVS) states<br>: HDD, CPU, network, camera recording state information, and performance states |

Figure 12:
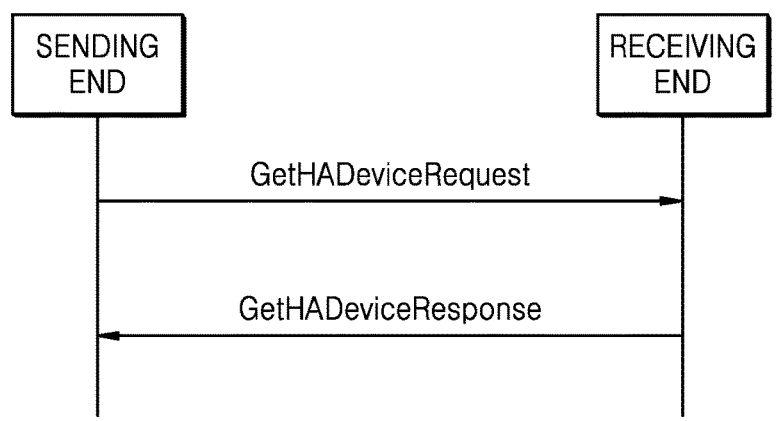
Figure 13:
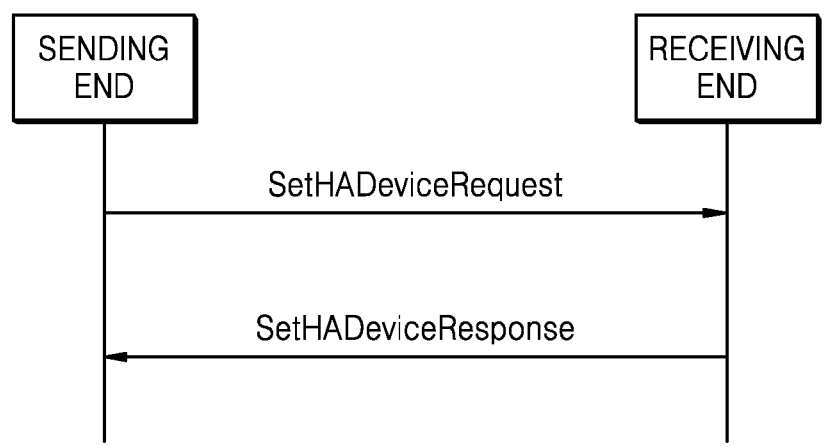
Figure 14:
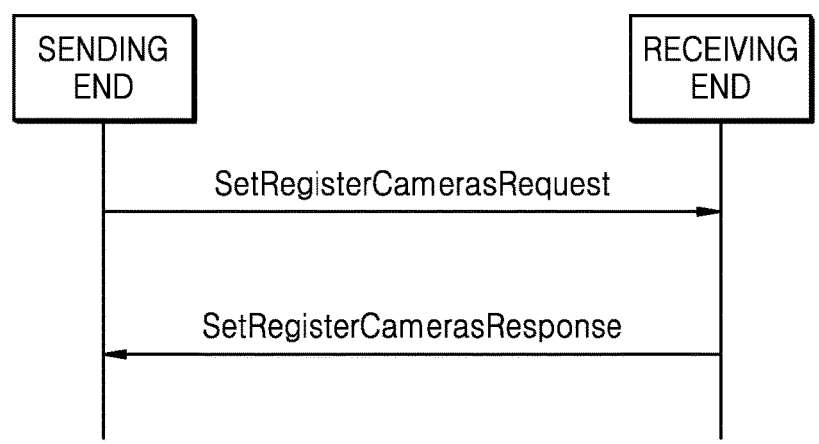

FIGS. 12 to 14 illustrate exemplary messages that may be sent or received for proxy recording settings of a video recorder connected to a network.

Referring to FIG. 12 and Table 4, a sending end may transmit a GetHADeviceRequest message to request information about a proxy video recorder, and a receiving end may transmit a GetHADeviceResponse message to report information about a proxy video recorder. The GetHADeviceResponse message may include information about the IP address and port of a proxy NVR (or NVS), and the IP addresses, ports, login information, and profile information of cameras to be transmitted to the proxy NVR (or NVS). The sending end may be a video recorder having an error, and the receiving end may be a user or a video recorder set as a master.

TABLE 4

| Message Name | Dscription |
| --- | --- |
| GetHADeviceRequest | A request for information about a proxy NVR (NVS) |
| GetHADeviceResponse | A response to a request for information about a proxy NVR (NVS)<br>: IP address and port of proxy NVR(NVS), IP addresses, ports, login information, and profile information of cameras to be transmitted to proxy NVR (NVS) |

Referring to FIG. 13 and Table 5, a sending end may transmit a SetHADeviceRequest message to request setting of a proxy video recorder, and a receiving end may transmit a SetHADeviceResponse message to report setting results of a proxy video recorder. The SetHADeviceRequest message may include information about the IP address and port of a proxy video recorder, the IP address, port, login information, and profile information of cameras to be registered in the proxy video recorder (NVR or NVS), error checking timeouts, error determining conditions. The error determining conditions may include network input/output states, performance states, HDD faults, CPU use percentage, and defective sectors. The SetHADeviceResponse message may include information about whether setting of a proxy video recorder has succeeded or failed, and failure reasons. The sending end may be a user or a video recorder set as a master, and the receiving end may be one of a plurality of video recorders.

TABLE 5

| Message Name | Dscription |
| --- | --- |
| SetHADeviceRequest | Transmission of information about a proxy NVR (NVS)<br>: proxy NVR (NVS) information (IP address and port); IP addresses, ports, login information, and profile information of cameras to be registered<br>: error checking time outs<br>: error determining conditions |
| SetHADeviceResponse | A response containing setting information of a proxy NVR (NVS)<br>: success or failure of setting request, and failure reasons |

If a proxy video recorder is set using the messages shown in Table 5, the receiving end may check the state of the proxy video recorder by using the messages shown in Table 3 according to time values set as error checking timeouts.

FIG. 14 and Table 6 illustrate exemplary messages for registering proxy recording cameras. A sending end may transmit a SetRegisterCamerasRequest message containing information about the number of cameras to be registered for proxy recording and information about the cameras (IP addresses, ports, login information, profile information, the order of priority of the cameras (channels)). A receiving end may transmit a SetRegisterCamerasResponse message containing information about success or failure of camera registration, and failure reasons. The sending end may be a video recorder set as a master, a video recorder having an error, or a user. The receiving end may be a proxy video recorder which will perform a proxy recording operation for a video recorder having an error.

TABLE 6

| Message Name | Description |
| --- | --- |
| SetRegisterCamerasRequest | Transmitting the number and information of cameras to be registered by request : the number, IP addresses, ports, login information, profile information, and order of priority of cameras to be registered by request |
| SetRegisterCamerasResponse | A response to registration request : the number of cameras registered according to a registration request, success or fail of requested registration, and failure reasons |

As described above, in the surveillance system of the exemplary embodiment, a plurality of video recorders communicate with one another and share camera registration information with one another. Therefore, each of the video recorders may automatically register a plurality of cameras.

In addition, the video recorders share image receiving and storing states of cameras registered in each of the video recorders and connected to a network. Therefore, if one of the video recorders has an error or is overloaded, the video recorder having an error or overloaded may provide information about image streams to the other video recorders so that the other video recorders may register cameras and store images taken by the cameras.

The exemplary embodiments may be applied to general communication network systems including a plurality of recording media.

As described above, according to the above exemplary embodiments, in the surveillance system, the video recorders communicate with one another and share camera registration information with one another. Therefore, each of the video recorders may automatically register the cameras.

Furthermore, if one of the video recorders has an error during operation, at least one of the other video recorders may perform a proxy recording operation in place of the video recorder having an error. Therefore, a surveillance vacuum may be prevented even if some of the video recorders have errors or malfunction.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements or units represented by a block as illustrated in FIG. 3 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A surveillance system comprising a plurality of video recorders and a plurality of cameras connected to a communication network,
    wherein the video recorders are configured to communicate with one another and share camera registration information with one another,
    wherein the camera registration information comprises information about at least one camera, among the plurality of cameras, which is registered at a corresponding video recorder among the plurality of video recorders, and wherein, if it is determined that one of the video recorders has an error, at least one proxy video recorder among the other video recorders which does not have the error, in place of the video recorder having the error, is configured to perform proxy recording of data captured by at least one camera registered at the video recorder having the error.

2. The surveillance system of claim 1, wherein the video recorder having the error is configured to provide camera information for the proxy recording of the data to the at least one proxy video recorder according to a preset proxy recording guideline, and wherein the camera information for the proxy recording comprises information about the at least one camera registered at the video recorder having the error.

3. The surveillance system of claim 1, wherein the video recorder having the error is configured to select the at least one proxy video recorder, among the plurality of other video recorders, and the at least one camera based on at least one of recording loads of the other video recorders and an order of priority of the plurality of cameras, and provide information about the at least one camera to the at least one proxy video recorder.

4. The surveillance system of claim 1, wherein at least one of the plurality of video recorders is configured to transmit a request for state information to the other video recorders and perform proxy recording of data captured by a camera registered at a video recorder not responding to the request in place of the video recorder not responding to the request.

5. The surveillance system of claim 4, wherein if the at least one of the plurality of video recorders receives the state information from the non-responding video recorder, the at least one video recorder is configured to transmit information about the camera subjected to the proxy recording and recording time information to the non-responding video recorder.

6. The surveillance system of claim 1, wherein at least one of the plurality of video recorders is configured to search the communication network to detect the other video recorders and acquire camera registration information from at least one of the detected video recorders.

7. The surveillance system of claim 1, wherein at least one video recorder among the plurality of video recorders is configured to register at least one camera among the plurality of cameras which is not registered at the other video recorders, and record data captured by the camera registered at the video recorder, and wherein, if error occurrence at the video recorder is detected, the video recorder is configured to transmit a proxy recording request for recording the data captured by the camera registered at the video recorder to at least one of the other video recorders, and if the error occurrence at another video recorder among the other video recorders is detected, the video recorder is configured to perform proxy recording of data captured by a camera registered at the other video recorder having the error.

8. The surveillance system of claim 7, wherein, in order to register the camera not registered in the other video recorders, the video recorder is configured to search the communication network to detect another video recorder among the plurality of video recorders and acquire address information of the detected video recorder.

9. The surveillance system of claim 8, wherein the video recorder is configured to transmit a request for camera registration information to the detected video recorder and receive the camera registration information from the detected video recorder.

10. The surveillance system of claim 9, wherein the request for camera registration information comprises authentication key information used to authenticate the video recorder transmitting the request for camera registration information.

11. The surveillance system of claim 7, wherein, in order to register the camera not registered in the other video recorders, the video recorder is configured to transmit a request for camera registration state information at the other video recorders to the other video recorders and receive the camera registration state information from the other video recorders.

12. The surveillance system of claim 7, wherein, if the error occurrence at the video recorder is detected, the video recorder is configured to request the at least one of the other video recorders or a user to send, to the video recorder, information about a proxy video recorder which is controlled to record the data, captured by the camera registered at the video recorder, in place of the video recorder and receive the information about the proxy video recorder, and is configured to send, to the proxy recorder, information about a proxy camera which is registered at the video recorder and controlled to transmit data captured by the proxy camera to the proxy video recorder.

13. The surveillance system of claim 7, wherein the video recorder is configured to request the at least one of the other video recorders to set a proxy video recorder, among the plurality of video recorders, which is to record data captured by at least one camera registered at the at least one of the other video recorders instead of the at least one of the other video recorders, and receive a result of the proxy video recorder setting from the at least one of the other video recorders.

14. The surveillance system of claim 13, wherein, the video recorder is further configured to request the at least one of the other video recorders to set a proxy camera which is registered at another video recorder among the plurality of video recorders and is to transmit data captured by the proxy camera to the at least one of the other video recorders instead of the other video recorder, and receive a result of the proxy camera setting from the at least one of the other video recorders.

15. A video recorder comprising:
a search module configured to search a communication network for a plurality of cameras and a plurality of other video recorders connected to the communication network;
a camera registration module configured to acquire camera registration information from the other video recorders and register at least one of the cameras which is not registered in the other video recorders; and
a proxy setting module configured to request at least one of the other video recorders to record data captured by a camera registered at the video recorder instead of recording by the video recorder if error occurrence at the video recorder is detected, and control recording of data, captured by a camera registered at another video recorder among the other video recorders, at the video recorder instead of recording at the other video recorder if the error occurrence at the other video recorder is detected,
wherein the camera registration information comprises information about at least one camera, among the plurality of cameras, which is registered at a corresponding video recorder among the other video recorders.

16. The video recorder of claim 15, wherein, if the error occurrence at the video recorder is detected, the proxy setting module is configured to provide camera information about the camera registered at the video recorder to a proxy video recorder among the other video recorder which is controlled to record the data, captured by the camera registered at the video recorder, instead of the video recorder, and wherein the proxy recorder is set according to a preset proxy recording guideline.

17. The video recorder of claim 15, wherein if the error occurrence at the video recorder is detected, the proxy setting module is configured to select at least one proxy video recorder and at least one camera which is controlled to transmit data captured by the at least one camera to the at least one proxy video recorder for recording thereat instead of recording at the video recorder based on at least one of recording loads of the other video recorders and an order of priority of the plurality of cameras, and provide information about the at least one camera to the at least one proxy video recorder.

18. The video recorder of claim 15, wherein the proxy setting module is configured to transmit a request for state information about the other video recorders to the other video recorders and control recording of data, captured by a camera which is registered at a video recorder not responding to the request, at the video recorder instead of recording at the non-responding video recorder.

19. The video recorder of claim 15, wherein the camera registration module is configured to transmit a request for the camera registration information to the other video recorders and receive the camera registration information from the other video recorders.

20. The video recorder of claim 19, wherein the request for camera registration information comprises authentication key information used to authenticate the video recorder for the receiving the camera registration information.

* * * * *